United States Patent [19]

Shisler et al.

[11] Patent Number: 4,832,723
[45] Date of Patent: May 23, 1989

[54] APPARATUS FOR PRODUCING DESIRED FIBER COLUMN CONFIGURATION

[75] Inventors: Donald E. Shisler, Littleton, Colo.; Rodney R. Smalley, Richmond, Ind.; Kent A. Rubright, Eaton, Ohio

[73] Assignee: Manville Corporation, Denver, Colo.

[21] Appl. No.: 156,052

[22] Filed: Feb. 16, 1988

[51] Int. Cl.⁴ .............................................. C03B 37/04
[52] U.S. Cl. ............................ 65/14; 65/3.43; 65/6; 425/8
[58] Field of Search ............... 65/3.1, 3.43, 3.44, 65/5, 6, 14, 15; 264/8; 425/8

[56] References Cited

U.S. PATENT DOCUMENTS

| | | |
|---|---|---|
| 2,944,284 | 7/1960 | Tillotson et al. .................. 65/14 X |
| 3,030,659 | 4/1962 | Slayter ................................ 65/14 X |
| 3,233,989 | 2/1966 | Stalego .................................... 65/6 |
| 3,650,718 | 3/1972 | Brossard .................................. 65/6 |
| 3,997,307 | 12/1976 | Faulkner et al. ...................... 65/14 |
| 4,046,539 | 9/1977 | Pitt ........................................... 65/6 |
| 4,058,386 | 11/1977 | Faulkner et al. ........................ 65/6 |
| 4,277,436 | 7/1981 | Shah et al. .......................... 65/14 X |

Primary Examiner—Robert L. Lindsay
Attorney, Agent, or Firm—John D. Lister; Cornelius P. Quinn; Fred A. Winans

[57] ABSTRACT

A rotary fiberization method and apparatus. Gas and/or liquid may be introduced into the void area produced by a rotary fiberization process. The gas and/or liquid may be used to alter the configuration of the fiber column and to apply desired materials to the fibers.

6 Claims, 4 Drawing Sheets

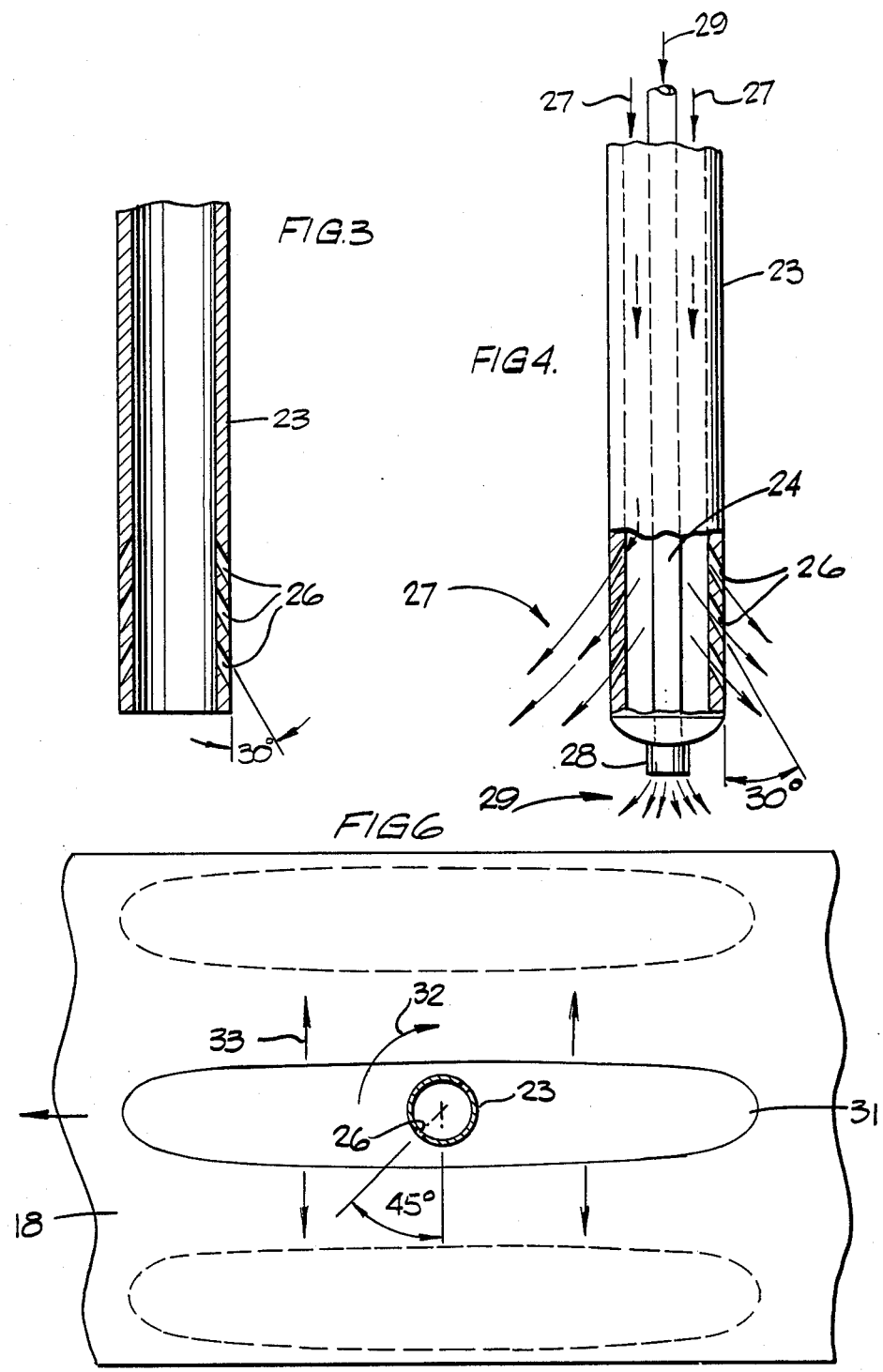

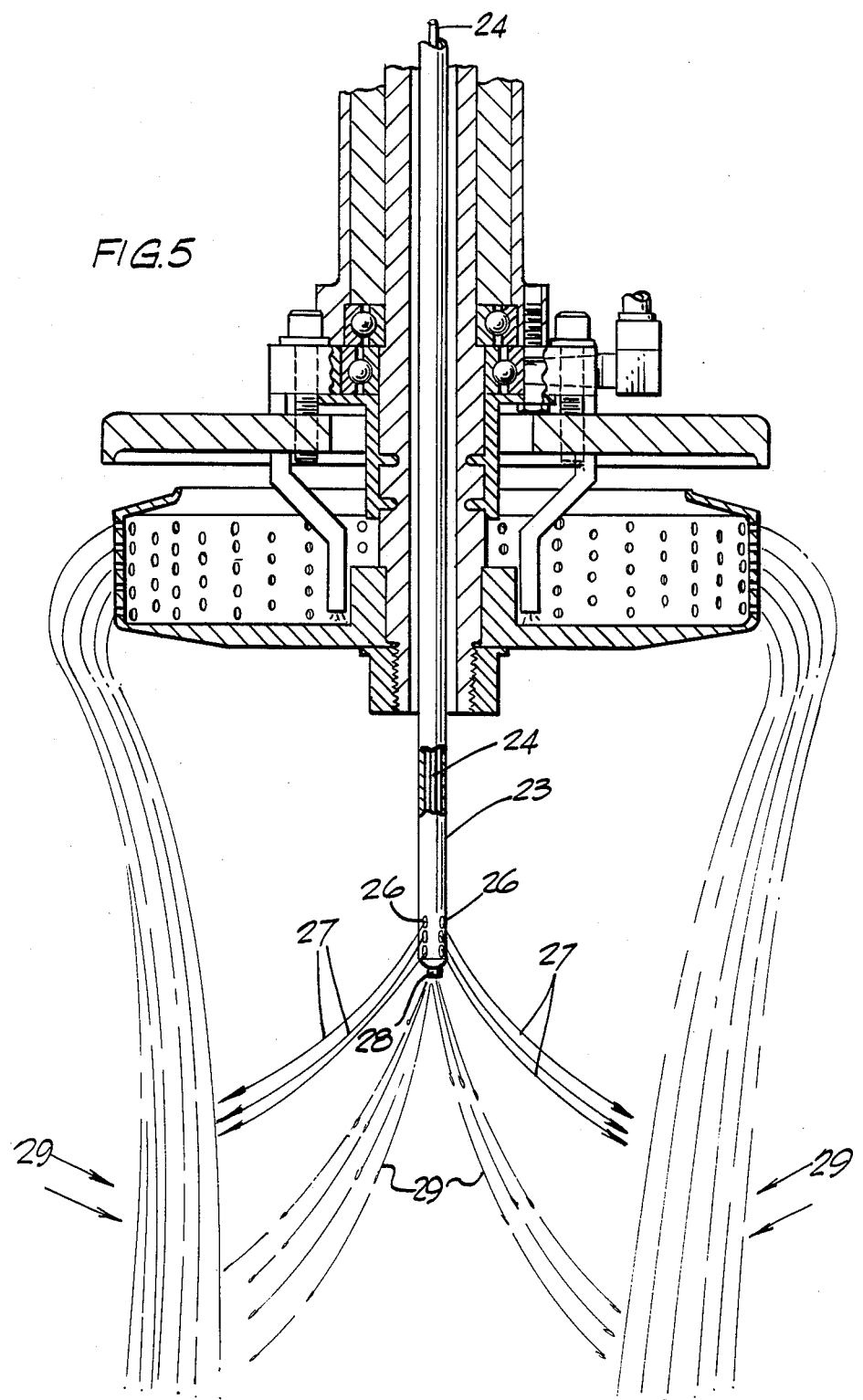

APPARATUS FOR PRODUCING DESIRED FIBER COLUMN CONFIGURATION

BACKGROUND OF THE INVENTION

1. Field of the Invention

The invention relates to the field of fiber manufacture. More particularly, the invention relates to the manufacture of fiber by a rotary process. In still greater particularity, the invention relates to a rotary fiberization process in which a gas or a liquid may be directed toward the manufactured fiber. By way of further characterization, but not by way of limitation thereto, the invention includes a means for directing air and binder into the center of the cone produced by the rotary fiberization process in order to reshape the fiber pattern.

2. Description of the Related Art

In existing rotary fiber glass processes, the glass fibers are formed from a rotating disc and attenuated in proximity to that rotating disc. An air ring outside the circumference of the rotating disc is used to direct the fibers downwardly and to assist in attenuating those fibers. This air and fiber movement creates a negative pressure zone below the rotating disc. The negative pressure zone, combined with a binder spray system which is sprayed from outside the column with an inward radial spray pattern tends to configure the column of fiber into a conical shape. Concerns with roping and/or handing of the fiber may thus be aggravated. This leads to degradation of density and binder distribution in the resulting fiber blanket which may cause less than desirable physical and thermal performance characteristics.

Referring to FIG. 1, a spinner 11 is shown suspended by an existing support and bearing assembly 16. A stream of molten glass 21 is dropped onto the rotating spinner 11 and the molten glass is extruded from holes 17 in the circumference of the rotating spinner. Streams of air from an air ring 12 around the circumference of the rotating spinner direct the fiber downwardly and assist in attenuating the fiber. Binder nozzles 15 are located around the circumference of the spinner such that binder may be sprayed onto the fibers as they are directed downwardly onto a conventional chain collection system 18. Such a rotary fiberization process is disclosed in U.S. Pat. No. 4,058,386 incorporated herein by reference.

The rotating spinner assembly along with the air jets may be oscillated back and forth across the width of the collection chain system as is described in U.S. Pat. No. 3,997,307 incorporated by reference herein. The oscillation and the rotating fiber pattern may result in the somewhat uneven distribution of the fibers onto the collection chain. In addition, the fibers tend to be randomly oriented on the fiber chain collection system. A insuction system 19 is used beneath the chain system to improve the distribution of the fibers on the chain system by removing air which is added to the fiber column by the air nozzles. This suction also prevents fibers from being blown into the air surrounding the collection system.

SUMMARY OF THE INVENTION

The method and apparatus of the present invention adds air and binder to the fiber from the center of the fiber column. That is, the spinner shaft is modified by adding means for introducing a gas and/or a liquid into the void area below the rotating disc. In particular, in a fiber glass rotary process, concentric hollow shafts are placed in the center of the rotating spinner disc and extend below the disc into the void area produced by the fiber column. Binder and air may be delivered through these hollow shafts or pipes in order to alter the shape of the fiber column and to spray binder onto the inside of the fiber column. Thus, the column of fiber is more receptive to binder application. The fiber column may then be more uniformly collected and this results in improved thermal performance characteristics of the resulting mat.

BRIEF DESCRIPTION OF THE DRAWINGS

FIG. 2 is a side sectional view of a rotary fiber disc with concentric hollow shafts of the present invention there through;

FIG. 3 is a side sectional view of the hollow shaft illustrating air distribution nozzles in the hollow shaft;

FIG. 4 is a side view of the concentric hollow shafts utilized in the present invention;

FIG. 5 is a side sectional view of a rotary fiberization process illustrating the present invention; and FIG. 6 is a top view of the fiber pattern produced by the method and apparatus of the present invention.

DESCRIPTION OF THE PREFERRED EMBODIMENT

Figure 1:
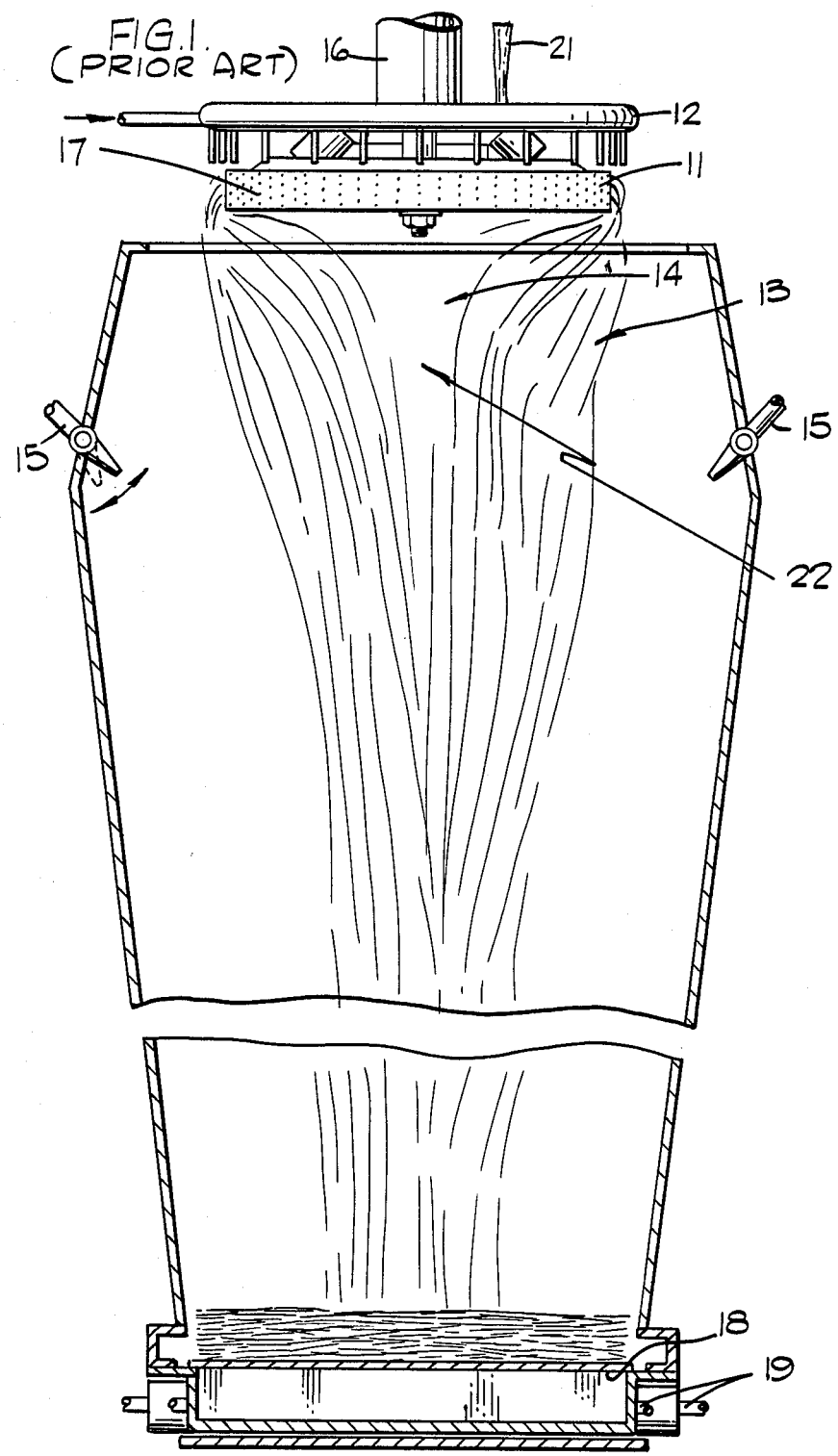
FIG. 1 is a partially sectioned side view of a prior art rotary fiber apparatus.

Referring to FIG. 1, a prior art rotary fiberization process is shown. A molten stream of glass 21 is directed downwardly onto spinning disc 11 and the glass is then forced through holes 17 in the periphery of the spinning disc 11 to produce fibers 13. These fibers are directed downwardly by high velocity air jets 12 and binder is sprayed onto the fiber column by binder nozzles 15. The fiber column is generally conically shaped with an apex 22 a known distance below the spinner disc. A negative pressure zone or void area 14 is found below the disc by the movement of the fiber, binder, and air. The fibers are directed onto a conventional collection chain 18.

Figure 2:
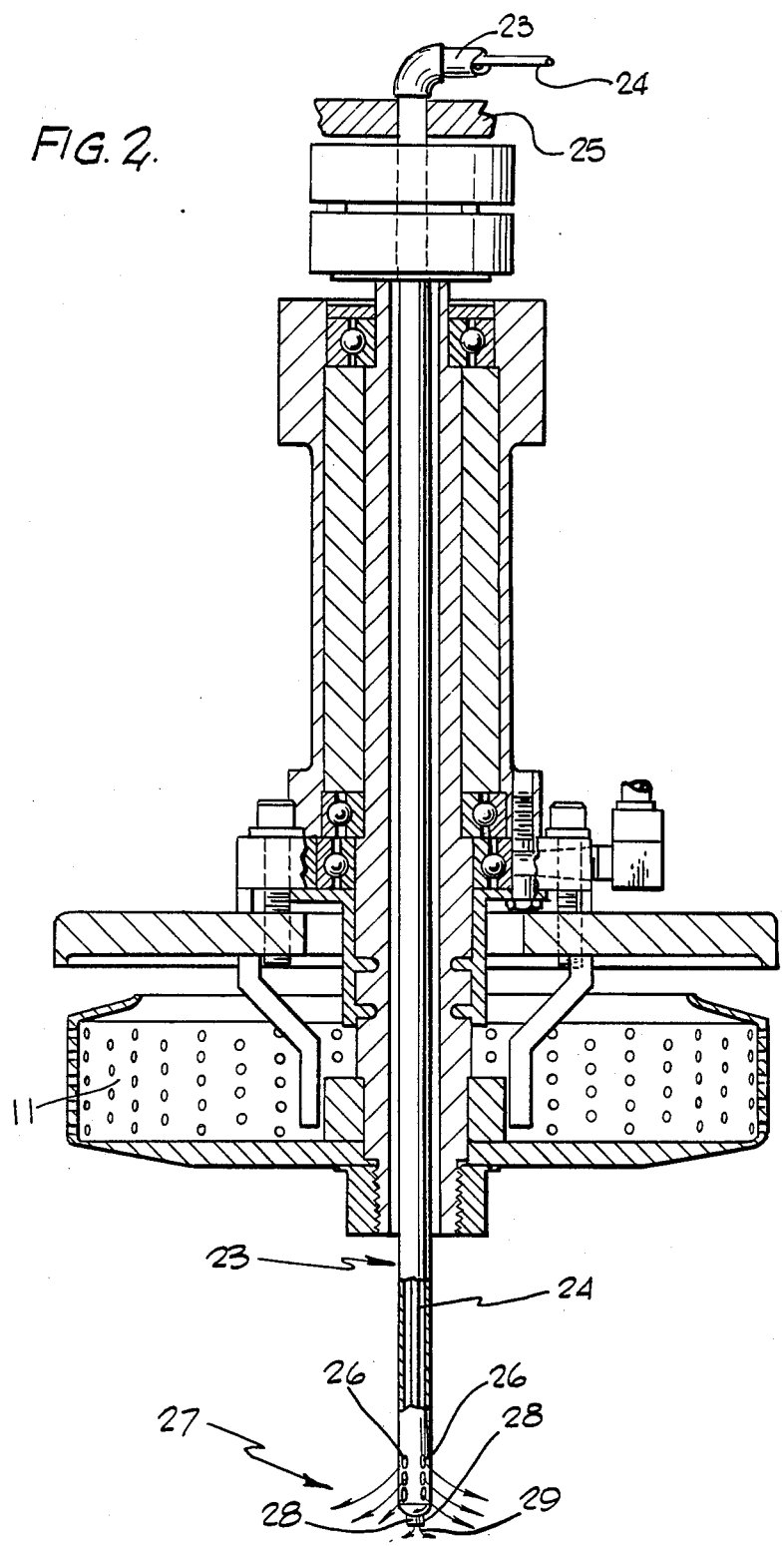

Referring to FIG. 2, a conventional spinner disc 11 is shown through the center of which concentric hollow shafts 23 and 24 are placed. The shafts are secured to the supporting apparatus of the spinner discs such that the shafts are stable. Specifically, the shafts are clamped as shown in FIG. 2 with clamps 25 as is known in the art. Holes 26 are provided in the outer shaft 23 through which air 27 or other gas may be directed. The inner hollow shaft 24, concentric with the outer hollow shaft 23, includes a conventional binder nozzle 28 at the end thereof to allow binder 29 to be pumped through the center hollow shaft 24 and out nozzle 27 thereby impacting the fiber column at the central void area thereof. That is, the void area 14 shown in FIG. 1 beneath the spinning disc is now subject to positive air 27 and binder 29 pressure through the hollow shafts 23 and 24.

Referring to FIG. 3, a side sectional view of outer hollow shaft 23 including air nozzles 26 is shown. Specifically, air nozzles 26 are drilled in the shaft at an angle of 30 degrees from the axis of the shaft. It has been found that the angle of 60 degrees downwardly from the horizontal or 30 degrees from the vertical axis of the shaft is optimum for modifying the fiber column. The shaft can only extend a portion of the distance from the spinner disc 11 to the apex 22 of the fiber cone because, if extended too far, the fiber tends to collect on the lower portion of the hollow shaft and thus block the air or binder flow. By providing a downward angle on the air nozzles 26, the shaft 23 may be made short enough to extend above the apex 22 of the fiber column and yet the downward angle of the nozzles 26 allows the air to be blown closer to the apex 22 thus modifying the fiber column out into an essentially cylindrical column as shown in FIG. 5. It has been found that the number and placement of the air nozzles determines the shape of the resulting fiber distribution pattern. That is, with 3 air nozzles on either side of the hollow shaft 23, the fiber pattern may be a cigar shaped or a "paint brush" pattern 31 as shown in FIG. 6. This long, narrow pattern is advantageous in certain fiber manufacturing operations in which the manufacturing apparatus is oscillated back and forth over the collection chain as previously described.

Referring to FIG. 4, a side view of the central binder shaft 24 and outer shaft 23 is shown. At the end of the binder shaft 24 is a conventional nozzle array 28 through which liquid binder 29 may be pumped and sprayed onto the interior of the fiber column. The exterior of the fiber column may additionally be sprayed with binder thus providing for a more complete and uniform coating of the binder onto the fiber. As discussed previously, in prior art apparatus the binder is sprayed only onto the outside of the column and thus the fibers in the interior of the column may be incompletely coated with binder.

Referring to FIG. 5, a side sectional view of the fiber production apparatus including the present invention is shown. The concentric hollow shafts 23 and 24 through the fiberizer disc are shown. Streams of air 27 are directed as described previously at an angle of 60 degrees downwardly from the horizontal to push the fiber column outward and allow the column configuration to be modified. In addition, the binder 29 is sprayed from the end of the binder shaft onto the interior of the fiber column. As above, binder 29 may also be sprayed onto the outside of the fiber column with conventional apparatus (not shown). Depending on the number and orientation of the air nozzles, the pattern of the fiber column may be altered in a number of configurations.

Referring to FIG. 6, a top view of the fiberizing apparatus is shown. This more particularly illustrates the shape of the preferred fiber pattern for the present invention. Specifically, the fiber column from fiberizing discs is manipulated into a cigar shaped or paint brush pattern 31. That is, the air nozzles 26 are placed in two vertical rows on the opposite sides of the air wand or shaft 23. Because air is directed in only two directions from the air wand the resulting fiber pattern is pushed outwardly into the pattern shown. However, as can be seen from the orientation of FIG. 6, the air nozzles are not in line with the resulting fiber pattern. This is because of the rotation of the fiber column as it emanates from the fiberizer disc. That is, assuming the fiberizer disc is rotating in a clockwise rotation as viewed from above, the fiber column will also rotate in a clockwise direction 32. The air nozzles in the air wand are oriented at approximately 45 degrees from the longitudinal axis of the desired paint brush pattern to adjust for rotation 32 of the fiber column such that it is properly oriented as it impacts the collection chain. Variables in the fiberizer operation and the distance from the fiberizer to the collection chain require this directional adjustment of the air nozzles. The side to side oscillation of the fiberizing unit thus allows this paint brush pattern to be swept across the width of the collection chain as illustrated by arrows 33.

In addition to the orientation of the air nozzles 26, the length of the air wand 23 and binder spray shaft 24 is important. If the air nozzles and binder nozzles are too close to the fiberizing discs, that is if the shafts are too short, the reconfiguration effect on the fiber column is reduced. The longer the shafts and the closer the air nozzles are to the apex 22 of the conical fiber pattern the more effective these nozzles are in spreading or modifying the fiber column to approach the desired shape. However, as discussed above, if the shafts are made too long, the fiber tends to collect on the lower portion of the shafts and stick thereto. This adversely effects the performance of the air and binder nozzles. It was found that with a 15 inch diameter spinner disc a placement of the air and binder nozzles approximately 10 inches below the fiberizer disc was optimum. For larger diameter spinner discs the air and binder nozzles should be placed a greater distance from the spinner discs. It can be determined empirically where the approximate apex 22 of the fiber cone is depending on the diameter of the fiberizer disc. Thus, various placements of the air and binder nozzles may be made to achieve specified purposes and distribution of the fiber column.

It is also important that the air and binder delivery shafts extending through the fiberizer discs be secured. That is, if the shafts are improperly secured to the supporting apparatus above the fiberizer discs, excessive vibration or rotation could occur resulting in damage to the shafts and/or discs and resulting in improper direction of the air and binder spray. The binder spray nozzle size is also important to prevent too much or too little binder from being applied to the inside of the fiber column. The binder nozzle type and size may be selected using standard engineering design considerations.

Advantages of the air and binder wands are that the column pattern may be adjusted to specific desired configurations. That is, as shown in FIG. 6, a "paint brush" pattern 31 has been developed to allow side to side oscillation of the fiberization apparatus to produce a uniform flow of fiber across the chain collection apparatus 18. It has been also advantageously found that, using the present invention, the fibers tend to be oriented in the machine or lengthwise direction (parallel to direction of movement of chain 18). Such orientation improves the tensile strength of the resulting mat produced by the collected fibers. That is, while fibers tended to be randomly oriented with the rotating prior art pattern, they tend to be oriented in a single direction with the present invention. This allows better engineering of the resulting mat. In addition, a wider paint brush pattern allows slower oscillations and/or higher production line speeds.

Suction apparatus 19 has been used below prior art chain collection devices in order to ensure that the collected fibers remain on the collection chain. It has been found that the employment of the present invention allows a reduction in the amount of suction put on the chain. As can be appreciated, this results in lower energy costs and better production processes. Finally, through proper flow of the air and binder, the fiber column is kept open and is more receptive to the binder application. The more uniform application of binder allows more uniform collection and thus improves the thermal performance characteristics of the resulting mat. A more uniform fiber mat results in better insulation capabilities because low density glass fiber areas allow heat flow resulting in poorer thermal performance. Thus, more uniform distribution is preferred.

In the preferred embodiment, a total of six $\Psi''$ holes were drilled at a 60° angle downward from the horizontal. That is, 3 holes on each side of the air wand were employed as discussed above. At an air pressure of 60 psi, and with a 45° shaft angle to the desired orientation, the pattern disclosed in FIG. 6 was achieved. By varying the number of holes, the pattern, the induced angle, the hole size, and the air pressure, the fiber column can be altered to other desired patterns. Thus, tensile strength, oscillation pattern, and fiber lay on a chain are all improved and a better mat can be produced using the present invention.

While the invention has been disclosed with respect to a preferred embodiment thereof, the claims are not to be so limited as changes and modifications may be made which are within the full intended scope of the invention as defined by these appended claims. For example, various hole patterns may be utilized to alter the shape of the resulting fiber lay pattern. If the holes were made sufficient in number, size, and with sufficient air pressure there through, it may be possible to eliminate the required oscillation in the fiber manufacturing apparatus. That is, the paint brush pattern shown in FIG. 6 may be turned 90° across the collection chain width and the oscillation eliminated. The elimination of this oscillation would be a desirable improvement in the fiber manufacturing process. As can be appreciated, such elimination of the oscillation would reduce mechanical problems associated with the oscillation mechanism.

While the invention has been disclosed as used in a fiber glass manufacturing process, it should be appreciated that any rotary fiber forming process may advantageously employ the method and apparatus disclosed and claimed herein. Refractory fiber, plastic fiber, sol-gel processes, or any other inorganic or organic fiber forming processes may employ the present invention. In addition, while the fibers are shown as extruded from a spinner disc, it should be appreciated that manufacturing processes in which a molten stream impinges on a rotating solid disc or tire is used may also employ the present invention. That is, the fiber columns which result from such conventional manufacturing processes may also be improved by utilizing the present invention in the center of the fiber column.

What is claimed is:

1. A rotary glass fiberizer including:
   a rotating disc member for receiving a stream of liquid glass and, under the influence of centrifugal forces, delivering a plurality of glass fibers emanating from said rotating disc;
   means for directing said fibers in a direction generally parallel to the axis of said disc and thereby forming a rotating generally cylindrical column of glass fibers defining an axially extending interior zone within said column, and below said disc and generally void of said fibers
   a traveling chain collection means for collecting said fibers in a continuous blanket;
   means for mounting stationery tubular shaft means above said disc, said shaft means including:
      a first tubular shaft extending from said mounting means through said rotating disc and terminating a predetermined distance below said disc generally within said zone for distributing material to said column of fibers; and,
      a second tubular shaft extending from said mounting means through said disc and terminating a predetermined distance below said disc generally within said zone, said second shaft in fluid communication with a pressurized gas and containing discharge means for directing said pressurized gas to impinge on said rotating column of fibers from said zone so as to, in conjunction with the rotating motion of said column, alter said generally cylindrical configuration of said fiber column to form a column having a generally elliptical cross sectional configuration.

2. Structure according to claim 1 wherein said discharge means includes a plurality of ports in said second shaft, said ports disposed generally adjacent the terminal end of said second shaft and in diametrically opposed positions to impart an expanding force within said zone on opposite sides of said fiber column to form said generally elliptical cross-sectional configuration and oriented to direct the pressurized gas to assist in directing the glass fibers to said collection means.

3. Structure according to claim 2 wherein said first and second tubular shafts are coaxial with one another and coaxial with the axis of said rotating disc and wherein said first tubular shaft extends within said second tubular shaft and said second tubular shaft terminates in a closed end prior to the termination of said first tubular shaft.

4. Structure according to claim 3 wherein said ports in said second tubular shaft are oriented downwardly at an angle of about 30° from the axis of said second shaft.

5. Structure according to claim 4 in which said pressurized gas is air and said air is supplied to said second tubular shaft at a pressure of about 60 psi.

6. Structure according to claim 1 wherein said material is a binder.

* * * * *